United States Patent [19]

Stamp

[11] Patent Number: 4,596,348
[45] Date of Patent: Jun. 24, 1986

[54] CAR-MOUNTED CARRIER

[76] Inventor: John C. Stamp, 9019 Buckeye Ct., Indianapolis, Ind. 46260

[21] Appl. No.: 681,298

[22] Filed: Dec. 13, 1984

[51] Int. Cl.⁴ .............................................. B60R 7/00
[52] U.S. Cl. ........................... 224/42.46 R; 224/42.42; 224/318
[58] Field of Search ................ 224/42, 45, 318, 42.42, 224/273, 42.01, 42.46 R, 42.31, 329

[56] References Cited

U.S. PATENT DOCUMENTS

| | | |
|---|---|---|
| 1,552,535 | 9/1925 | Beerstecher . |
| 1,894,164 | 1/1933 | Doht . |
| 2,273,492 | 2/1942 | Malmer . |
| 2,302,300 | 11/1942 | Davies . |
| 2,425,629 | 8/1947 | Mayer . |
| 2,488,263 | 11/1949 | Bishman . |
| 2,635,796 | 4/1953 | Davolt . |
| 2,797,851 | 7/1957 | Leake . |
| 3,904,092 | 9/1975 | Piper . |
| 4,007,862 | 2/1977 | Heftmann ........................... 224/329 |
| 4,077,554 | 3/1978 | Goode . |
| 4,108,342 | 8/1978 | Riva . |
| 4,253,594 | 3/1981 | Parks ................................. 224/318 |

Primary Examiner—Stephen Marcus
Assistant Examiner—Robert Petrik
Attorney, Agent, or Firm—E. Victor Indiano

[57] ABSTRACT

A car-mounted article carrier is disclosed which includes a carrier member. The carrier member is engageable with a joint between a fixed car panel member and a car panel member of a type which can be moved between an open and closed position. The carrier member is unitarily formed of a resilient material and includes a first end portion for placement interiorly of the joint. The first end portion is sufficiently thick to be substantially unable to move through the joint when the movable car panel member is in the closed position. The carrier also includes a second end portion for placement exteriorly of the joint. The second end portion includes a reinforced portion which defines an aperture. A sheet-like intermediate portion is disposed between the first and second end portions for placement in the joint. The intermediate portion is sufficiently thick to engage both the movable and fixed car panel members and sufficiently thin to fit between the movable and fixed car panel members when the movable car panel member is in the closed position.

15 Claims, 8 Drawing Figures

U.S. Patent   Jun. 24, 1986   4,596,348
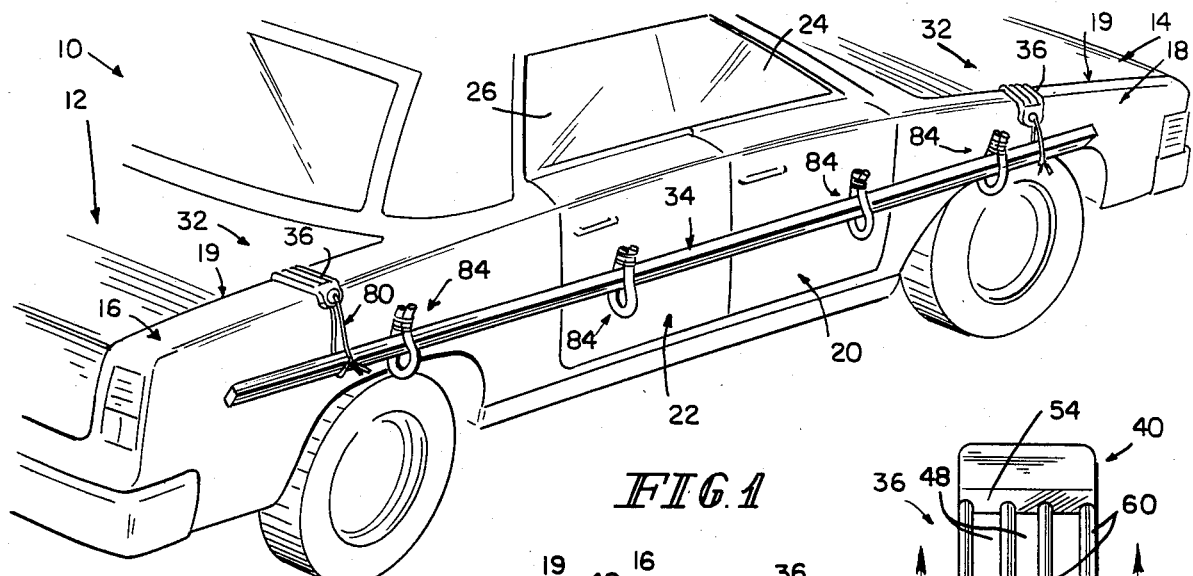
FIG. 1
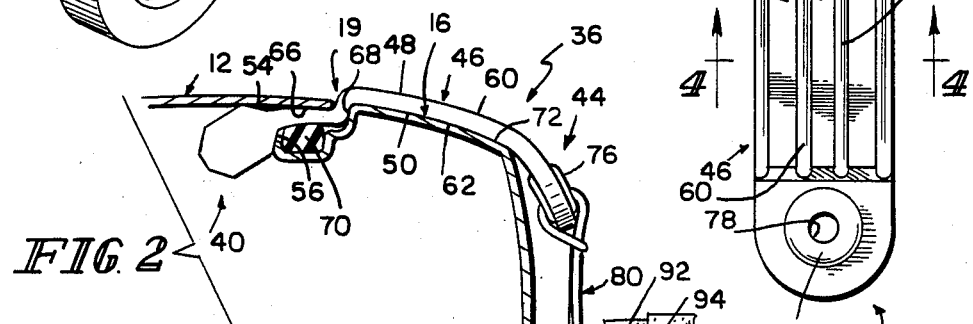
FIG. 2
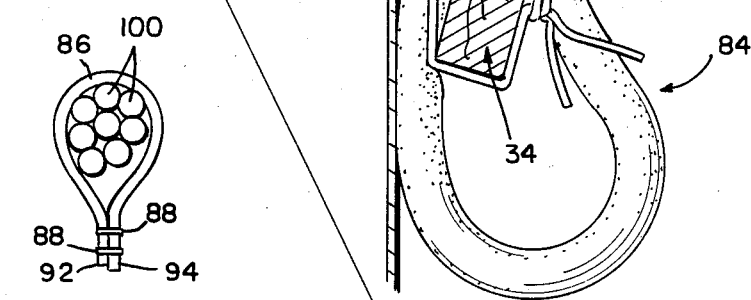
FIG. 3
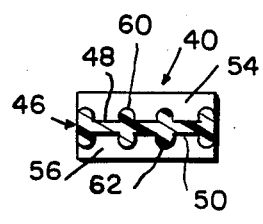
FIG. 4
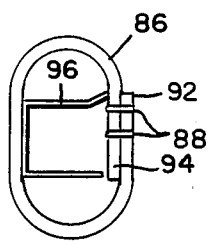
FIG. 5
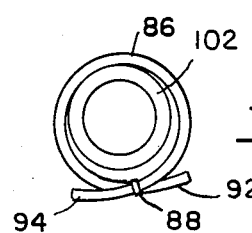
FIG. 6
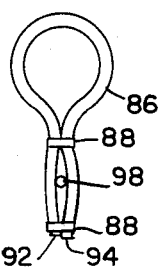
FIG. 7
FIG. 8

CAR-MOUNTED CARRIER

The present invention relates to article carriers, and more particularly to car-mounted article carriers for carrying elongated articles which are too long to be carried in either the interior or trunk of a car.

Several car-mounted articles are known. Riva U.S. Pat. No. 4,108,342 relates to a carrier attachment for automobiles which includes a line having a closed-loop portion at one end and an enlarged plug at the other end. The plug is positioned within the trunk or hood compartment of an automobile and the line is positioned to project outwardly therefrom through the space between the trunk or hood and the adjacent fender. A suction cup is positioned along the line proximal to the plug and serves as a temporary positioning element for positioning the device with respect to the car fender.

Davolt U.S. Pat. No. 2,635,796 relates to a parcel tie for automobiles. Davolt's parcel tie includes a strap which is adapted for receiving a slotted plug 10 at one end thereof. A metal ring receives the strap at the end of the strap opposite the plug.

Leake U.S. Pat. No. 2,797,851 and Goode U.S. Pat. No. 4,077,554 relate to rigid carriers which attach to the window of an automobile. Bishman U.S. Pat. No. 2,488,263 relates to a rigid carrier which attaches to a vehicle over the top edge of the door of the vehicle. Doht U.S. Pat. No. 1,894,164 and Beerstecher U.S. Pat. No. 1,552,535 relate to rigid pole carriers which mount to a fender of an automobile.

Piper U.S. Pat. No. 3,904,092 relates to a rigid ski rack which is adapted to attach to the edge of a trunk lid. The rack includes a support member to which the skis are attached, and a clamp for mounting the support member to the vehicle.

Other car-mounted article carriers are known which mount to a vehicle in the area adjacent the vehicle's windowsill. Mayer U.S. Pat. No. 2,452,629 relates to a luggage carrier having a supporting hook which fits over the windowsill of a vehicle when the windows of the vehicle are open. Davies U.S. Pat. No. 2,302,300 and Malmer U.S. Pat. No. 2,273,492 relate to carriers which engage the vehicle in the space between a window and a rubber water guard adjacent the window.

None of the above-discussed devices is without its problems. Some of the more complex devices having multiple parts require a relatively labor-intensive manufacturing process. Additionally, some of the devices do not provide adequate safeguards for protecting a vehicle's finish. Further, some of the devices do not provide means for being securely attached to the vehicle, and thus could create a safety hazard.

The instant invention improves upon the above-discussed devices by providing an article carrier which is easy to manufacture, is securely attachable to the vehicle, and which is designed to protect the vehicle's finish.

In accordance with the present invention, a car-mounted article carrier is provided. The carrier comprises a unitarily formed, resilient carrier member having a first end portion, a second end portion and a sheet-like intermediate portion. The carrier member is engageable with a joint between a fixed car panel member and an adjacent car panel member movable between an open and a closed position. The first end portion is intended for placement interiorly of a car panel joint and is sized to prevent its movement through the joint when the movable car panel member is in the closed position. The second end portion is provided for placement exteriorly of the joint and includes a reinforced portion defining an aperture. The sheet-like intermediate portion is disposed between the first and second end portions for placement in the joint. The intermediate portion is sufficiently thick to engage both the movable and fixed car panel members, and sufficiently thin to fit between the movable and fixed car panel members when the movable car panel member is in the closed position.

Preferably, the intermediate portion of the carrier member includes a plurality of raised, parallel, compressible ribs. The ribs are positioned to engage a surface of at least one of the movable and fixed car panel members in an area of the panel member in the joint to provide frictional resistance to lateral movement of the carrier member in the joint. Additionally, the ribs are positioned to engage a surface of at least one of the movable and fixed panel members in an area of the panel member exteriorly of the joint to restrict lateral movement of the article carried by the carrier member.

A cushion means is also provided for use with the car-mounted carrier. The cushion is attachable to the carried elongated article to maintain the article in a spaced relation from a surface of the car. The cushion means comprises an elongated resilient cushion member having a first end portion and a second end portion. The cushion member also includes selective joining means for permitting the user to encircle the elongated article with the cushion member, and to join the first and second end portions of the cushion member together.

One aspect of the present invention is that the carrier member is unitarily formed of a resilient material such as a soft, natural or synthetic rubber. The one-piece design of the carrier member has the advantage of facilitating its manufacture by well-known molding techniques. Additionally, the shape and composition of the carrier is selected to prevent the carrier member from causing damage to the car's finish.

Another aspect of the present invention is that the carrier member includes a plurality of raised, compressible ribs which are formed on its intermediate portion. Several advantages are obtained through the use of the compressible ribs. The compressibility of the ribs permits the intermediate portion of the carrier to extend through the joint between the adjacent car panel members without causing the sheet metal of the panel members to become bent or buckled. The raised ribs engage either the movable car panel member, the fixed car panel member, or both, to provide the additional advantage of securely positioning the carrier member in the joint, thereby helping to prevent lateral movement of the carrier member along the length of the joint during use.

One feature of the ribs is that they can be formed to extend between the first and second end portions of the carrier member so that portions of the ribs are placed exteriorly of the joint. When a load is applied to the carrier member by a carried article, the carrier member will tend to bend to place these exteriorly located rib portions against the finished surface of the car. The engagement between the ribs and the finish has the advantage of minimizing the propensity of the carried article to swing relative to the car and carrier member. Additionally, the shape and composition of the ribs permit the ribs to engage the surface of the car to prevent this swinging movement without damaging the car's finish.

A further feature of the present invention is that a cushion means can be provided for use with the carrier member. The cushion means is optionally attachable to the article being carried and adapted to be positioned between a surface of the car and the carried article. Preferably, the cushion means comprises an elongated resilient rod-shaped cushion member. The elongated resilient cushion member protects the car's surface from damage caused by the carried article.

Additional features and advantages of the present invention will become apparent to those skilled in the art upon consideration of the following detailed description of a preferred embodiment exemplifying the best mode of carrying out the invention as presently perceived. The detailed description particularly refers to the accompanying figures in which:

FIG. 1 is a perspective view showing the device utilized in conjunction with an automobile;

FIG. 2 is a side sectional view on an enlarged scale taken through the trunk of the automobile of FIG. 1 showing the manner in which the device of the present invention is anchored therein;

FIG. 3 is a top plan view of the carrier member of the present invention;

FIG. 4 is a sectional view of the carrier member taken along lines 4—4 of FIG. 3;

FIG. 5 is a side view of the cushion means of the present invention, shown in conjunction with a guttering article;

FIG. 6 is a side view of the cushion means of the present invention shown in conjunction with a plurality of small-diameter pipes;

FIG. 7 is a side view of the cushion means of the present invention shown in conjunction with a rod-like member; and FIG. 8 is a side view of the present invention shown in conjunction with a relatively large-diameter pipe member.

A vehicle such as a conventional car 10 is shown in FIG. 1. The car 10 includes several movable panel members such as trunk lid 12 and hood 14, and several fixed panel members such as rear fender 16 and front fender 18. The trunk lid 12 and hood 14 are movable, relative to rear fender 16 and front fender 18, respectively, between an open position (not shown) and a closed position. When the trunk lid 12 and hood 14 are in their open positions, a wide space is formed between the trunk lid 12 and rear fender 16, and between the hood 14 and front fender 18. However, when the trunk lid 12 and hood 14 are in their closed positions, a joint 19 is formed between the trunk lid 12 and rear fender 16 and between the hood 14 and front fender 18. At joint 19 the edges of the respective adjacent panels are in a closely spaced relation. Typically the trunk lid 12 and rear fender 16 and the hood 14 and front fender 18 are each, respectively, in a leakproof engagement.

Some members of the car such as front door 20 and rear door 22 can function as both fixed and movable car panel members. For example, the front door 20 is a movable car panel member relative to front fender 18 but is a fixed car panel member relative to movable front door window 24. Similarly, rear door 22 is a movable panel member relative to rear fender 16, but a fixed panel member relative to movable rear door window 26.

A carrier means 32 is shown in FIGS. 1–4 for carrying elongated articles 34 such as wood planks. Carrier means 32 is especially useful for carrying elongated articles 34 which are too long to be carried in the interior of the car 10, or in the trunk of the car 10. Carrier means 32 includes a carrier member 36. Carrier member 36 is preferably unitarily formed from a resilient material, such as a rubber or plastic material. For example, the carrier member 36 can be made from a neoprene rubber having a durometer of between 45 and 50 Shore A. The carrier member 36 is generally sheet-like, being preferably approximately 5 inches (12.7 cm) long, 1.75 inches (4.5 cm) wide, and having a varying thickness throughout its length. The carrier member 36 includes a thickened, first end portion 40 preferably of octagonal cross-section, a second end portion 44 having a rounded tip, and a sheet-like intermediate portion 46, which includes a first surface 48 and an opposite second surface 50.

The first end portion 40 is provided for placement interiorly of joint 19, and is sufficiently thickened to prevent movement of the first end portion 40 through joint 19 when the movable panel member (e.g. trunk lid 12) is in its closed position relative to the fixed panel member (e.g. rear fender 16). The thickened end portion is preferably approximately 0.75 inches (1.9 cm) thick. The first end portion 40 includes a first anchoring surface 54 which is disposed adjacent the first surface 48 of the intermediate portion 46, and a second anchoring surface 56 which is disposed adjacent the second surface 50 of the intermediate portion 46. Each of the first and second anchoring surfaces 54, 56 are disposed at approximately a 135° angle from the first and second surfaces 48, 50, respectively. The anchoring surfaces 54, 56 are provided for wedging in joint 19 when an outwardly directed force is exerted on the carrier member 36. This wedging action of the anchoring surfaces 54, 56 serves to both maintain the first portion 40 interiorly of the joint 19, and also serves to provide frictional resistance to lateral movement of the carrier member 36 in the joint 19.

A first series of raised, parallel, compressible ribs 60 are formed on the first surface 48 of intermediate portion 46, and a second series of raised, parallel compressible ribs 62 are formed on the second surface 50 of intermediate portion 46. Ribs 60, 62 each extend the full length of the intermediate portion 46, between the first end portion 40 and the second end portion 44. The first series of ribs 60 are provided for engaging an underside surface 66 of the trunk lid in the area of the trunk lid 12 in the joint 19. Similarly, the second series of ribs 62 engage a surface 68 of the rear fender 16 and a rubber trunk lid seal 70 which is carried on a flange formed as a part of rear fender 16. Preferably, the intermediate portion is approximately 0.125 inches (0.32 cm) thick in the area of the intermediate portion 46 between the ribs and approximately 0.375 inches (0.95 cm) thick in the area at the ribs 60, 62.

The size and configuration of the ribs 60, 62 are chosen to permit the ribs 60, 62 to be sufficiently thick to engage the surfaces 66, 68 of the trunk lid 12 and rear fender 16, respectively, when the trunk lid 12 is in the closed position. This engagement between the ribs 60, 62 and trunk lid 12 and fender 16, respectively, helps to prevent lateral movement of the carrier member 36 in the joint 19. However, the ribs 60, 62 are sufficiently compressible and thin to permit the intermediate portion 46 to extend through joint 19, without causing buckling, bending, or other damage to the sheet metal of the trunk lid 12 and fender 16 in the area adjacent joint 19.

As best shown in FIG. 2, a portion of the intermediate portion 46 and hence ribs 60, 62 extend exteriorly of the joint 19. The intermediate portion 46 is sufficiently flexible to bend under a load, such as that exerted by the carried article 34, to permit the second series of ribs 62 to engage the finished exterior surface 72 of the rear fender 16. The soft composition from which carrier member 36 is made, and the compressibility of the ribs 60, 62 permit the ribs 60, 62 to engage the exterior surface 72 without marring or scratching the finish of the exterior surface 72. Additionally, the relatively high-friction surface of the ribs 60, 62 engages the exterior surface 72 in such a manner so as to restrict lateral movement of the carrier member 36 on the exterior surface 72 in response to the lateral swinging of the carried article 34. This has the effect of reducing the amount of lateral swinging of the carried article 34.

The second end portion 44 includes a reinforced portion, such as a thickened annular rim 76, which defines at its center an aperture 78. An attachment means such as rope 80 is passed through the aperture 78 to form a slipknot for engaging the rope 80 to the carrier member 36. Rope 80 is preferably chosen to have a length which is long enough to suspend the carried elongated article 34 at a desired height, and to have sufficient strength to not break under the load imposed by the carried article 34. Additionally, rope 80 is preferably a soft, material rope and not a metal cable, so that if the rope 80 should contact the exterior surface 72 of the fender 16, it will not marr or scratch the finish of the exterior surface 72.

As shown in FIG. 1, the carrier means 32 can be used in tandem, with one carrier member 36 being secured in the joint 19 between the trunk lid 12 and the rear fender 16, and another carrier member 36 being disposed in the joint between the hood 14 and front fender 18. The carrier means 32 are used in tandem so that support is provided for the elongated article 34 near each end of the elongated article 34, to suspend the elongated article 34 along the side of the car 10 in a position generally parallel with the roadway.

A plurality of cushion means 84 are shown in FIGS. 1, 2, and 5-8, which are attachable to the carried elongated article 34 for maintaining the elongated article 34 in a spaced relationship from the side surface of the car 10. The cushion means 84 comprises an elongated rod shaped cushion member 86 which is preferably made from a closed-cell polyethylene compound. It has been found by applicant that one-inch (2.54 cm.) diameter Hercules backer rod cut into 24 inch (60.96 cm) lengths serves well for this purpose. The cushion member 86 is sufficiently flexible to permit the user to bend it to encircle the carried article 34, and to join together the first end portion 92 and second end portion 94 in a parallel, non-colinear relation. A selective joining means, such as a pair of rubber bands 88, is provided to permit the user to join together the first and second end portions 92, 94 in this parallel, non-colinear relation.

The manner in which the cushion member 86 an elongated article 34, such as, encircles the elongated article 34 will vary, depending upon the type of elongated article 34 being carried. As shown in FIG. 2, the cushion member 86 encircles an elongated article 34, such as a wood plank member in a manner wherein the first and second end portions 92, 94 are parallel, with the end surfaces of the first and second end portions 92, 94 facing the same direction. FIG. 5 shows a cushion member 86 configuration which might be used for encircling a gutter 96. In this configuration, the first and second end portions 92, 94 extend in a parallel, non-colinear relation with the end surfaces of the first and second end portions 92, 94 facing in opposite directions.

FIG. 6 illustrates a configuration of a cushion member 86 configured similarly to the cushion member 86 shown in FIG. 2. In FIG. 6, the cushion member 86 is shown as encircling a plurality of small-diameter pipes 100, such as electrical conduit pipes.

FIG. 7 shows cushion member 86 in a configuration similar to that shown in FIG. 6, except that the pair of rubber bands 88 are spaced widely apart from each other sufficiently to receive therebetween a small-diameter rod member 98 such as a fishing pole.

FIG. 8 shows a configuration of a cushion member 86 wherein first and second end portions 92, 94 are disposed in a somewhat parallel, but non-colinear relation, and wherein the end surfaces of the first and second portions 92, 94 face in opposite directions. The configuration shown in FIG. 8 is especially adaptable for carrying large-diameter lightweight pipe 102, such as PVC plumbing pipe and aluminum duct pipe.

Although the invention has been described in detail with reference to certain preferred embodiments and specific examples, variations and modifications exist within the scope and spirit of the invention as described and as defined in the following claims.

I claim:

1. A car-mounted article carrier comprising
    a carrier member engageable in a joint between a fixed car panel member and a car panel member movable between an open and a closed position, the carrier member being unitarily formed of a resilient material and including
    a first end portion for placement interiorly of the joint, the first end portion being sized to prevent its movement through said joint when the movable car panel member is in the closed position,
    a second end portion for placement exteriorly of the joint,
    a sheet-like intermediate portion disposed between the first and second end portions for placement in the joint, the intermediate portion being sufficiently thick to engage both the movable and fixed car panel members and sufficiently thin to fit between the movable and fixed car panel members when the movable car panel member is in the closed position, the sheet-like intermediate portion including a first surface, a second surface and a plurality of raised ribs formed on and extending along at least one of the first and second surfaces to prevent lateral movement of the intermediate portion in the joint.

2. The invention of claim 1 wherein the plurality of raised ribs comprises a series of generally parallel, compressible ribs extending from the first end portion to the second end portion.

3. The invention of claim 1 wherein said ribs comprise a series of longitudinally extending ribs, at least one of said ribs extending the entire length of the intermediate portion.

4. The invention of claim 1 wherein said ribs comprise a series of longitudinally extending ribs, at least one of said ribs extending along the intermediate portion for a distance at least as great as one-half of the length of the intermediate portion.

5. The invention of claim 1 wherein at least one of said ribs extends for a length sufficient to engage both the surface of at least one of the movable and fixed car panel members in an area of the panel member in the joint, and at least one of the movable and fixed panel members in an area of the panel member exteriorly of the joint.

6. The invention of claim 1 wherein the first end portion includes a first anchoring surface adjacent the first surface of the intermediate portion and a second anchoring surface adjacent the second surface of the intermediate portion, the first and second anchoring surfaces being configured to wedge in the joint in response to an outwardly directed force exerted on the carrier member.

7. The invention of claim 6 wherein the angle between the first anchoring surface and the first surface of the intermediate portion is about 135°.

8. The invention of claim 1 wherein the material from which the carrier member is unitarily formed comprises a rubber compound.

9. The invention of claim 8 wherein the rubber compound comprises a neoprene rubber having a durometer of between about 45 and 50 Shore A.

10. The invention of claim 1 wherein said ribs extend longitudinally along the at least one of the first and second surfaces and are positioned to additionally engage a surface of one of the movable and fixed car panel members when an article is carried by the carrier, to restrict lateral movement of the article.

11. The invention of claim 1 wherein said ribs comprise a series of raised, parallel, longitudinally extending compressible ribs, the ribs being positioned to engage both the surface of at least one of the movable and fixed car panel members in an area of the panel member in the joint to prevent lateral movement of the carrier member in the joint, and additionally to engage a surface of at least one of the movable and fixed panel members in an area of the panel member exteriorly of the joint to restrict lateral movement of the article carried by the carrier member.

12. The invention of claim 11 wherein the ribs are formed on each of the first and second surfaces to permit the ribs to engage a surface of each of the movable and fixed panel members in the areas of the panel members at the joint, and at least one of the ribs extends along the intermediate portion from the first end portion to the second end portion, the ribs being sufficiently compressible to be compressed by the movable and fixed panel members when the movable panel member is in the closed position.

13. A car-mounted article carrier for carrying an elongated article comprising
a carrier member engageable in a joint between a fixed car panel member and a car panel member movable between an open and a closed position, the carrier member including
a first end portion for placement interiorly of the joint, the first end portion being sufficiently thickened to prevent its movement through the joint when the movable car panel member is in the closed position, a second end portion for placement exteriorly of the joint, and an intermediate portion extendable through the joint, the intermediate portion being generally sheet-like and including a first surface, an opposite second surface, and a plurality of raised ribs formed on and extending along at least one of the first and second surfaces, the ribs being positioned to engage at least one of the fixed and movable car panel member to prevent lateral movement of the carrier member in the joint,
attachment means for attaching the elongated article to the second end portion, and
cushion means attachable to the elongated article and adapted to be positioned between a surface of the car and the elongated article to maintain the elongated article and car surface in a spaced relation, the cushion means comprising a resilient elongated rod shaped member having a first end portion, a second end portion, and selective joining means for permitting the user to encircle said elongated article with the cushion member and to join the first and second end portions of the cushion member together to maintain the cushion member around the elongated article.

14. The invention of claim 13 wherein the carrier member is unitarily formed of a resilient material, and the first end portion includes an anchoring surface adjacent the intermediate portion for wedging between the movable and fixed car panel members.

15. The invention of claim 13 wherein the cushion member comprises a closed cell polyethylene rod, the rod being sufficiently flexible to permit the rod to be bent to place the first and second portions in a parallel, non-colinear relation.

* * * * *